United States Patent [19]

Sauber et al.

[11] 3,954,628

[45] May 4, 1976

[54] PREPARATION OF SEA WATER MUDS USEFUL FOR EARTH DRILLING OPERATIONS

[75] Inventors: Charles A. Sauber; Louis E. Roper, both of Bartlesville, Okla.

[73] Assignee: Phillips Petroleum Company, Bartlesville, Okla.

[22] Filed: Nov. 26, 1973

[21] Appl. No.: 418,913

[52] U.S. Cl............................ 252/8.5 A; 252/8.5 C
[51] Int. Cl.²......................................... C09K 7/02
[58] Field of Search...................... 252/8.5 A, 8.5 C

[56] References Cited
UNITED STATES PATENTS

| | | | |
|---|---|---|---|
| 2,425,768 | 8/1947 | Wagner | 252/8.5 |
| 3,471,402 | 10/1969 | Shannon | 252/8.5 |
| 3,668,122 | 6/1972 | Branscum | 252/8.5 |

OTHER PUBLICATIONS

Hercules Cellulose Gum—Properties and Uses, booklet published by Hercules Powder Co., 1960, pp. 1–10 and 17.

Hercules Cellulose Gum, booklet by Hercules Incorporated, Wilmington, Del., 1968, pp. 1–6, 10–22, 28, 29 and 31.

*Primary Examiner*—Herbert B. Guynn

[57] ABSTRACT

A low viscosity sodium carboxymethyl cellulose polymer, e.g. which has a degree of substitution (D.S.) of, say, 0.9 or higher and a Brookfield viscosity of 400 to 3100 centipoise as a 2 percent solution in distilled water at 25°C, when added to a non-dispersed sea water drilling fluid followed by addition of a sodium carboxymethyl cellulose (sodium CMC) which has a D.S. of, say, 0.9 or higher and Brookfield viscosity of greater than about 10,000 centipoise as a 2 percent solution in distilled water at 25°C yields a low water loss drilling fluid which has a lower viscosity and lower gel strength than when the same materials are added in reverse order or when only one or the other is added step-wise by itself to the drilling fluid.

6 Claims, No Drawings

PREPARATION OF SEA WATER MUDS USEFUL FOR EARTH DRILLING OPERATIONS

This invention relates to drilling fluids. It also relates to the preparation of drilling fluids. Further, it relates to drilling of earth formations.

In one of the concepts of the invention it provides a carboxymethyl cellulose or CMC drilling fluid essentially containing a low viscosity sodium CMC, such as herein described, first to the drilling fluid e.g., a non-dispersed sea water drilling fluid, followed by addition of a considerably higher viscosity sodium CMC also as herein described, the lower viscosity polymer having been first added at all times to yield a low water loss drilling fluid which has lower viscosity and gel strength than when the same materials are added in reverse order or when only one or the other is added step-wise by itself. The invention in a further concept provides the method of compositing a drilling fluid as herein described in which the lower viscosity sodium CMC is first added to the drilling fluid to be affected. Still further, in a concept the invention provides a method for drilling an earth formation employing a drilling fluid which has been modified or established, as herein described.

We have found that the addition of a low viscosity sodium CMC polymer to a non-dispersed sea water mud prior to addition of a high viscosity sodium CMC polymer results in a low water loss mud with lower yield point and gel strength than when high viscosity material is added first, either by itself or in combination with low viscosity sodium CMC.

An object of this invention is to produce an improved drilling fluid. Another object of the invention is to provide a method for producing such an improved drilling fluid. A further object of the invention is to provide an improved method for drilling of earth formations.

Other aspects, concepts and objects of the invention including its several advantages are apparent from a study of this disclosure and the appended claims.

According to the present invention there is added to a non-dispersed sea water mud, first, a low viscosity sodium CMC polymer following which there is added to the mud or drilling fluid a considerably higher viscosity sodium CMC.

It appears that the a priori addition of the low viscosity polymer when added to the non-dispersed sea water drilling fluid before the higher viscosity polymer is added will permit the inhibiting of solids in the drilling fluid and the formation in which the drilling fluid is used from absorbing water without unduly increasing drilling fluid viscosity. Thus, the solids are inhibited by coating of them to prevent water absorption and consequent breaking down of the cuttings in the drilling fluid to increase fine solids in the fluid. Inhibiting the formation prevents breaking down and sloughing of the wall of the hole or bore, thereby holding the bore hole to proper size or gauge and minimizing solids added to the drilling fluid from the wall of the bore hole.

Considerable information on the various properties of sodium CMC or cellulose gums is available in "Hercules Cellulose Gum — Properties and Uses", copyright Hercules Powder Company, 1960 and in "Hercules Cellulose Gum," copyright by Hercules Incorporated, 1968.

The information of the pamphlets is relied herein as being available to the art and as being the best information available at this time on the preparation and properties of the materials therein discussed some of which are herein discussed.

The materials used in this invention are types of sodium carboxymethyl cellulose (sodium CMC) which differ primarily in their viscosity in distilled water solution. They may be characterized as polyanionic cellulosic polymers of high molecular weight which are readily dispersible in water base muds ranging from fresh water to saturated salt water. Suitable materials are described in the following table; however, other sodium CMC of similar degree of substitution and viscosity grade are also suitable for use in the invention. The properties given identify the grades of the sodium CMC.

TABLE I

| Grade of Sodium CMC | Degree of Substitution (D.S.) | Viscosity, Centipoise, Brookfield 2% Solution =7pph (lbs. per bbl.) | 1% Solution =3½ pph (lbs. per bbl.) |
|---|---|---|---|
| Hercules Type 12M | 1.2 | 400–3100 cp | — |
| Hercules Type 9M | 0.9 | 400–3100 cp | |
| Hercules Type 9H | 0.9 | 10,000+ cp | 1,000–5,000 cp |
| Hercules Type 7H | 0.7 | 10,000+ cp | 1,300–2,200 cp |
| Hercules Type 7L | 0.7 | 25–50 cp | |
| Hercules Type 7M | 0.7 | 50–200 cp | |

Viscosities are stated for solutions in distilled water at 25°C. Measurements of viscosity are made by Brookfield Synchro-Lectric Model LVF viscometer. It has 4 speeds and 4 spindles covering the range of 0 to 100,000 centipoise and is made by Brookfield Engineering Laboratories, Stoughton, Massachusetts.

Sodium CMC materials can be made by reacting sodium carboxymethyl units with the anhydroglucose units (basic cellulose) in the polymer chain to attach sodium carboxymethyl units thereto at some of the three possible sites. Degree of substitution (D.S.) represents the average number of sites on each molecule actually occupied by a sodium carboxymethyl unit.

Analysis of sodium CMC will determine only its D.S. and viscosity grade.

Generally, according to the invention, a low viscosity polymer such as sodium CMC, which has a degree of substitution (D.S.) of 0.9 or higher and a Brookfield viscosity of 400 to 3100 centipoise as a 2% solution in distilled water at 25°C, when added to a non-dispersed sea water drilling fluid before addition of a sodium CMC which has a D.S. of 0.9 or higher and a Brookfield viscosity of greater than 10,000 centipoise as a 2% solution in distilled water at 25°C yields, as stated, a low water loss drilling fluid which has lower viscosity and gel strength than when the same materials are added in reverse order or when only one or the other is added step-wise by itself. Total polymer concentration usually is approximately 1 to 2 ppb (pounds per barrel).

Effective amounts of sodium CMC to be added are:

P-95 Rotary Clay is a low yield clay which is obtained from the Rogers Lake Area in California.

"Sea salt" is a synthetic material simulating sea salt. It is obtainable from Lake Products Company, 1254 Grover Rd., St. Louis, Mo. 63125.

Parts by Weight of Polymers

TABLE II

EFFECT OF ORDER OF ADDITION OF CMC ON PROPERTIES OF LABORATORY, SEA WATER MUD

Procedure: Sift first polymer into 280 ml of base mud while stirring at low speed with a Hamilton Beach (HB) malt mixer. Stir 10 minutes with a Multimixer (MM). Sift in second polymer (HB) and stir 10 minutes (MM). Cool to room temperature, stir 2 minutes (MM) and test.

| No. | First Polymer, ppb | | Second Polymer, ppb | | AV | PV | YP | Gels | WL |
|---|---|---|---|---|---|---|---|---|---|
| Base Mud (P-95-B5 Sea water mud) | | | | | 10 | 4 | 12 | 9/12 | 45.0 |
| Part A —CMC 9H and CMC 9M or CMC 12M | | | | | | | | | |
| 1 | CMC 9M | 0.5 | CMC 9M | 0.5 | 7 | 6 | 2 | 1/2 | 14.4 |
| 2 | CMC 9H | 0.5 | CMC 9H | 0.5 | 14.5 | 12 | 5 | 1/10 | 10.9 |
| 3 | CMC 9M | 0.5 | CMC 9H | 0.5 | 9 | 8 | 2 | 1/5 | 11.1 |
| 4 | CMC 9H | 0.5 | CMC 9M | 0.5 | 11.5 | 10 | 3 | 1/6 | 13.2 |
| 5 | CMC 12M | 0.5 | CMC 9H | 0.5 | 10 | 9 | 2 | 1/3 | 11.0 |
| 6 | CMC 9H | 0.5 | CMC 12M | 0.5 | 14.5 | 11 | 7 | 1/11 | 12.0 |
| Part B —CMC 7H and CMC 7M or CMC 7L | | | | | | | | | |
| 7 | CMC 7M | 0.5 | CMC 7M | 0.5 | 7.5 | 6 | 3 | 2/18 | 31.5 |
| 8 | CMC 7H | 0.5 | CMC 7H | 0.5 | 12 | 8 | 8 | 9/30 | 30.3 |
| 9 | CMC 7M | 0.5 | CMC 7H | 0.5 | 9 | 6 | 6 | 5/24 | 31.0 |
| 10 | CMC 7H | 0.5 | CMC 7M | 0.5 | 10 | 7 | 6 | 6/25 | 30.2 |
| 11 | CMC 7M | 1.0 | CMC 7H | 1.0 | 12.5 | 11 | 3 | 1/4 | 7.6 |
| 12 | CMC 7H | 1.0 | CMC 7M | 1.0 | 12.5 | 11 | 3 | 1/4 | 8.1 |
| 13 | CMC 7L | 1.0 | CMC 7L | 1.0 | 5.5 | 5.5 | 0 | 1/1 | 12.0 |
| 14 | CMC 7H | 1.0 | CMC 7H | 1.0 | 16.5 | 15 | 3 | 1/6 | 7.9 |
| 15 | CMC 7L | 1.0 | CMC 7H | 1.0 | 10 | 9 | 2 | 1/4 | 8.9 |
| 16 | CMC 7H | 1.0 | CMC 7L | 1.0 | 10 | 9 | 2 | 1/3 | 9.4 |

| | Low Range | Preferred Range | High Range |
|---|---|---|---|
| Low viscosity CMC | 1 | 1 | 3 |
| Higher viscosity CMC | 7 | 3 | 1 |
| Total parts by weight | 8 | 4 | 4 |

More specifically, the ratio of CMC 12M or CMC 9M to CMC 9H can be varied from 1 to 7 up to at least 3 to 1 to give the desired results as herein set forth.

The specific amounts and ratios of the selected CMC's will depend to an extent upon their degree of substitution and their viscosity which corresponds to polymer chain length. Also, each batch of a particular CMC will vary slightly as to its viscosity producing properties.

The data herein show that the invention appears to apply only to sodium CMC with a D.S. of approximately 0.9 or above having the viscosities stated. Sodium CMC with a D.S. of 0.7 (Type 7L, 7M and 7H) are shown in Table II, Part B not to affect the drilling fluid in the manner of the invention. The following abbreviations and definitions aid in more fully understanding this disclosure.

AV - Apparent Viscosity, cp
PV - Plastic Viscosity, cp
YP - Yield Point, lb/100 sq ft
Gels - Gel Strength (10 sec/10 min), lb/100 sq ft
WL - Water Loss, ml/30 minutes
FV - Funnel Viscosity, seconds per quart (API)
Cl - Chlorides, mg/liter
MB - Methylene Blue, reported as ppb of bentonite
ppb - Pounds Per Barrel
Base Mud - 5 parts of P-95 Rotary clay to 1 part bentonite in sea water From the foregoing data, it appears that the ability of CMC to reduce the water loss and to increase the viscosity of salt mud increases with degree of substitution and viscosity grade, reference being had to Table I above for the various grades of sodium CMC and their viscosities. In Table II, the tests to be compared are 1 and 2; 7 and 8; and 13 and 14.

Often, especially in high solid muds, CMC 9H, which ordinarily gives the best water loss control, gives more viscosity than is desired. Thus, according to the invention, the discovery which has been made can be seen to be unexpected and of considerable importance. Thus, the addition of CMC 12M or CMC 9M prior to adding CMC 9H results in a mud with lower viscosity, yet with very good water loss control, than when CMC 9H alone is used or even when the order of addition is reversed. In Table II, compare tests 2, 3 and 4; 2, 5 and 6.

The order of addition effect of the discovery did not hold true for CMC type 7. See Table II, part B in which the base mud used was the same as in part A of the table. The base mud in the tests was a laboratory, sea-water mud as defined herein.

Generally, it is known that degree of substitution affects the solubility or water dispersibility of CMC. See U.S. Pat. No. 3,471,402, column 2, lines 29–31 and elsewhere for information concerning sodium salt of carboxymethyl cellulose. The disclosure of the patent is incorporated herein by reference.

Generally, degree of substitution principally affects water solubility. Polymer chain length primarily affects viscosity of a water solution of CMC. In the "Hercules Cellulose Gum" (1960) brochure, FIG. 1 and Table II, on pages 4 and 5 of the brochure, show viscosities of various gums in fresh water, including CMC 9 and CMC 12.

TABLE III

EFFECT OF ORDER OF ADDITION OF CMC ON PROPERTIES OF NATIVE, SEA WATER, FIELD MUD*

| No. | First Polymer, ppb | | Second Polymer, ppb | | FV** | AV | PV | YP | Gels | WL |
|---|---|---|---|---|---|---|---|---|---|---|
| Part A — Same procedure as in Table II | | | | | | | | | | |
| Base Mud | — | | — | | — | 12.5 | 5 | 15 | 12/18 | 43.0 |
| 1 | CMC 9M | 0.5 | CMC 9M | 0.5 | — | 8.5 | 8 | 1 | 1/1 | 8.9 |
| 2 | CMC 12M | 0.5 | CMC 12M | 0.5 | — | 12.5 | 10 | 5 | 1/5 | 8.7 |
| 3 | CMC 9H | 0.5 | CMC 9H | 0.5 | — | 16 | 14 | 4 | 1/15 | 6.8 |
| 4 | CMC 9M | 0.5 | CMC 9H | 0.5 | — | 12 | 10 | 4 | 1/14 | 7.4 |
| 5 | CMC 9H | 0.5 | CMC 9M | 0.5 | — | 11 | 10 | 2 | 1/4 | 8.2 |
| 6 | CMC 12M | 0.5 | CMC 9H | 0.5 | — | 13.5 | 11 | 5 | 1/10 | 7.4 |
| 7 | CMC 9H | 0.5 | CMC 12M | 0.5 | — | 12.5 | 10 | 5 | 1/7 | 7.8 |
| Part B — Same procedure as in Table II except that 1750 ml samples were treated with CMC while stirring on a Lightnin mixer and the funnel viscosity was measured, followed by the other tests. At no time were these samples stirred with a Multimixer.*** | | | | | | | | | | |
| Base Mud | — | | — | | 35 | 11.5 | 6 | 11 | 8/11 | 49.3 |
| 8 | CMC 9H | 0.5 | CMC 9H | 0.5 | 97 | 43 | 25 | 36 | 17/38 | 13.3 |
| 9 | CMC 9M | 0.5 | CMC 9H | 0.5 | 48 | 24.5 | 21 | 7 | 1/10 | 12.4 |
| 10 | CMC 9H | 0.5 | CMC 9M | 0.5 | 54 | 30.5 | 22 | 17 | 7/22 | 10.8 |

*Base Mud from Well No. 6, East Cameron Block 273, Offshore Louisiana, OCS G-2048. Density 9.9 lb/gal, chlorides 15,500 ppm.
**FV = Marsh Funnel Viscosity, see API.
***Multimixer speed is constant, 11,600± rpm; Lightnin mixer speed is variable, 1725 rpm maximum.

Referring now to Table III, it is essential to note that in the first test of the field mud high speed mixers such as the Multimixer were used. The order of addition effect found previously in laboratory mud did not occur. See part A of Table III. However, it is known from field experience with CMC 9H that it will drastically thicken the mud here in question. Further, it is also known by us that in the field, mud mixing is done at relatively low shear rates and therefore is not as thorough as in the laboratory. Accordingly, additional tests were made to approximate field mixing. The mud was treated while stirring with a lower speed mixer, i.e., a Lightnin mixer, instead of a Multimixer. The Marsh funnel viscosity of the mud was determined. The Marsh funnel instrument is universally used in the field because the test is quick and simple. Ordinarily, all muds are treated in the field to keep the drilling mud in a specific funnel viscosity range. Examination of the data of part B of Table III shows, dramatically, the importance of the order of addition.

Our preferred order of addition gave the lowest funnel viscosity, apparent viscosity, plastic viscosity, yield point (value) and gel strength. The low yield point value and low initial gel strength are extremely important if gas bearing zones are drilled. Gas can readily break out of such a drilling fluid. On the other hand, with drilling fluids having high yield point value and high initial gel strength, it is difficult for gas to break out of the fluid. Even when special equipment is used to de-gas a drilling fluid, such properties are undesirable.

TABLE IV

EFFECT OF RATIOS AND ORDER-OF-ADDITION OF CMC ON PROPERTIES OF LABORATORY, SEA WATER MUDS

| First Polymer, ppb | | | Second Polymer, ppb | | | Ratio* | AV | PV | YP | Gels | WL |
|---|---|---|---|---|---|---|---|---|---|---|---|
| Procedure: Sift first polymer into 280 ml of P95-B5 sea water mud while stirring at low speed with a HB malt mixer. Stir 10 minutes with a MM. Sift in second polymer (HB) and stir 10 minutes (MM). Cool to room temperature, stir 2 minutes (MM) and test. | | | | | | | | | | | |
| Part A: CMC 9H and CMC 12M | | | | | | | | | | | |
| CMC | 12M, | 0.125 | CMC | 9H, | 0.875 | 1-7 | 12 | 10 | 4 | 0/8 | 9.8 |
| | 9H, | 0.875 | | 12M, | 0.125 | | 15 | 11 | 8 | 0/17 | 10.1 |
| CMC | 12M, | 0.17 | CMC | 9H, | 0.83 | 1-5 | 11.5 | 10 | 3 | 0/5 | 9.5 |
| | 9H, | 0.83 | | 12M, | 0.17 | | 14.5 | 11 | 7 | 0/13 | 10.0 |
| CMC | 12M, | 0.25 | CMC | 9H, | 0.75 | 1-3 | 11 | 10 | 2 | 0/4 | 9.5 |
| | 9H, | 0.75 | | 12M, | 0.25 | | 14.5 | 11 | 7 | 0/15 | 10.1 |
| CMC | 12M, | 0.5 | CMC | 9H, | 0.5 | 1-1 | 9.5 | 8 | 3 | 0/4 | 10.0 |
| | 9H, | 0.5 | | 12M, | 0.5 | | 13.5 | 10 | 7 | 0/13 | 11.2 |
| CMC | 12M, | 0.75 | CMC | 9H, | 0.25 | 1-1/3 | 9.5 | 8 | 3 | 0/5 | 10.4 |
| | 9H, | 0.25 | | 12M, | 0.75 | | 14 | 9 | 10 | 0/13 | 11.3 |
| Part B: CMC 9H and CMC 9M | | | | | | | | | | | |
| CMC | 9M, | 0.125 | CMC | 9H, | 0.875 | 1-7 | 13 | 12 | 2 | 0/8 | 10.6 |
| | 9H, | 0.875 | | 9M, | 0.125 | | 14.5 | 12 | 5 | 0/10 | 10.8 |
| CMC | 9M, | 0.17 | CMC | 9H, | 0.83 | 1-5 | 11.5 | 10 | 3 | 0/6 | 10.6 |
| | 9H, | 0.83 | | 9M, | 0.17 | | 14 | 11 | 6 | 0/12 | 11.3 |
| CMC | 9M, | 0.25 | CMC | 9H, | 0.75 | 1-3 | 11 | 10 | 2 | 0/4 | 11.2 |
| | 9H, | 0.75 | | 9M, | 0.25 | | 14 | 12 | 4 | 0/8 | 11.0 |
| CMC | 9M, | 0.5 | CMC | 9H, | 0.5 | 1-1 | 9 | 8 | 2 | 0/5 | 11.2 |
| | 9H, | 0.5 | | 9M, | 0.5 | | 11.5 | 9 | 5 | 0/9 | 12.6 |
| CMC | 9M, | 0.75 | CMC | 9H, | 0.25 | 1-1/3 | 8.5 | 8 | 1 | 0/4 | 11.6 |
| | 9H, | 0.25 | | 9M, | 0.75 | | 11 | 9 | 4 | 0/5 | 14.1 |
| CMC | 9M, | 0.5 | CMC | 9M, | 0.5 | — | 7 | 7 | 0 | 0/2 | 13.5 |

*Ratio = Ratio of CMC 12M or 9M to CMC 9H.

The foregoing table additionally illustrates the invention.

Generally, the drilling fluids which are used for drilling earth formations according to the method of drilling earth formations of the invention can be prepared as now known in the art, except as modified by the present invention.

U.S. Pat. Nos. 2,425,768, Aug. 19, 1947, C. R. Wagner and 3,668,122, June 6, 1972, C. D. Branscum, deal with the preparation and use of drilling fluids. Their disclosure is incorporated herein by reference.

Reasonable variation and modification are possible within the scope of the foregoing disclosure and the appended claims to the invention the essence of which is that the order of addition of sodium CMC, as herein defined, has been found, dramatically, to improve the properties of a drilling mud and that an improved drilling mud and a method for drilling earth formations have been set forth, substantially as described.

We claim:

1. A method for preparing a sea water based well drilling mud which comprises adding to sufficient sea water to maintain the mud as a fluid, sufficient clay material to form a filter cake on the wall of the well and two water soluble sodium carboxymethyl celluloses, the first being a low viscosity polymer having a degree of substitution of about 0.9 or higher, a Brookfield viscosity of about 400 to about 3100 centipoise as a 2 percent solution in distilled water at 25°C and the second, which is added after the first has been completely added being a sodium carboxymethylcellulose which has a degree of substitution of 0.9 or higher and a Brookfield viscosity of greater than about 10,000 centipoise as a 2 percent solution in distilled water at 25°C said two water soluble sodium carboxymethyl celluloses being added in a total amount sufficient to reduce the water loss due to filtration through said filter cake but insufficient to increase the viscosity of said drilling mud to such an extent that it cannot be desirably circulated, the ratio of said lower viscosity sodium carboxymethylcellulose to said higher viscosity sodium carboxymethylcellulose being in the range from about 1:7 to about 3:1.

2. A method according to claim 1 wherein the first sodium carboxymethylcellulose has a degree of substitution of about 0.9 or a degree of substitution of about 1.2 and the second sodium carboxymethylcellulose has a degree of substitution of about 0.9.

3. A method of claim 1 wherein the total polymer concentration is in the range of about 1 to 2 pounds per barrel of drilling mud circulated.

4. In a process for drilling wells comprising the steps of (1) drilling the well with well drilling tools, and (2) circulating through the well during said drilling a water based drilling mud which forms a filter cake on the wall of the well, the improvement comprising circulating a sea water based drilling mud as prepared in claim 1.

5. In a process of claim 4 the improvement comprising using a total polymer concentration in the range of about 1 to 2 pounds per barrel of drilling mud circulated.

6. In a process according to claim 4 the improvement wherein the first sodium CMC is selected from Hercules type 9M and Hercules type 12M and the second sodium CMC is Hercules type 9H.

* * * * *